United States Patent
Pfau

(10) Patent No.: US 11,932,266 B2
(45) Date of Patent: Mar. 19, 2024

(54) RIDER-ASSISTANCE SYSTEM AND CONTROL METHOD FOR RIDER-ASSISTANCE SYSTEM

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 329 days.

(21) Appl. No.: 17/599,812

(22) PCT Filed: Mar. 24, 2020

(86) PCT No.: PCT/IB2020/052740
§ 371 (c)(1),
(2) Date: Sep. 29, 2021

(87) PCT Pub. No.: WO2020/201907
PCT Pub. Date: Oct. 8, 2020

(65) Prior Publication Data
US 2022/0176979 A1    Jun. 9, 2022

(30) Foreign Application Priority Data

Mar. 29, 2019   (JP) ................................ 2019-066837

(51) Int. Cl.
*B62J 50/22*       (2020.01)
*B60W 50/02*       (2012.01)
(Continued)

(52) U.S. Cl.
CPC ........ *B60W 50/0205* (2013.01); *B60W 50/14* (2013.01); *B62J 45/20* (2020.02);
(Continued)

(58) Field of Classification Search
CPC . B62J 45/20; B62J 50/22; B62J 45/41; B62K 23/02; B60W 50/14; B60W 50/04;
(Continued)

(56) References Cited

U.S. PATENT DOCUMENTS

2010/0066828 A1    3/2010  Disaro et al.
2012/0323444 A1   12/2012  Rieger et al.
(Continued)

FOREIGN PATENT DOCUMENTS

| DE | 102009013176 A1 | 9/2010 |
| DE | 102012211965 A1 | 5/2014 |
| JP | 2009116882 A    | 5/2009 |

OTHER PUBLICATIONS

Biral et al., Intersection Support System for Powered Two-Wheeled Vehicles: Threat Assessment Based on a Receding Horizon Approach, 2012, IEEE, p. 805-816 (Year: 2012).*

(Continued)

*Primary Examiner* — McDieunel Marc
(74) *Attorney, Agent, or Firm* — Michael Best & Friedrich LLP

(57) ABSTRACT

The present invention obtains a rider-assistance system capable of appropriately assisting with driving by a rider of a straddle-type vehicle and a control method for such a rider-assistance system.
The rider-assistance system that assists with driving by the rider of the straddle-type vehicle includes: a peripheral environment detector that is mounted to the straddle-type vehicle and detects peripheral environment of the straddle-type vehicle; an input device that is mounted to the straddle-type vehicle and is operated by the rider of the straddle-type vehicle; and a controller that governs operation of the rider-assistance system. The controller includes: an acquisition section that acquires pitch angle correction target information that is target information on pitch angle correction of the peripheral environment detector; and a correction operation performing section that performs correction operation for detection of the peripheral environment by the (Continued)

peripheral environment detector on the basis of the pitch angle correction target information acquired by the acquisition section.

15 Claims, 3 Drawing Sheets

(51) Int. Cl.
- *B60W 50/14* (2020.01)
- *B62J 45/20* (2020.01)
- *B62K 23/02* (2006.01)
- *B62J 45/41* (2020.01)

(52) U.S. Cl.
CPC .............. *B62J 50/22* (2020.02); *B62K 23/02* (2013.01); *B60W 2050/0215* (2013.01); *B60W 2300/36* (2013.01); *B60W 2420/403* (2013.01); *B62J 45/41* (2020.02)

(58) Field of Classification Search
CPC ............. B60W 50/0205; B60W 50/00; B60W 2420/42; B60W 2520/16; B60W 2422/10; B60W 2050/0075; B60W 2050/0215; B60W 2540/00; B60W 2300/36; B60W 2050/0062

See application file for complete search history.

(56) References Cited

U.S. PATENT DOCUMENTS

| | | |
|---|---|---|
| 2016/0110932 A1 | 4/2016 | Klein et al. |
| 2018/0216545 A1 | 8/2018 | Kurata |
| 2021/0221368 A1* | 7/2021 | Lavi .................... B60W 30/162 |
| 2021/0276552 A1* | 9/2021 | Igari .................... B60W 30/16 |
| 2022/0073068 A1* | 3/2022 | Lavi .................... B60W 50/16 |
| 2022/0410854 A1* | 12/2022 | Igari .................... B60W 30/14 |

OTHER PUBLICATIONS

Nehaoua et al., Review on single track vehicle and motorcycle simulation, 2011, IEEE, p. 940-945 (Year: 2011).*

Kumarasamy et al., Rider assistance system with an active safety mechanism, 2015, IEEE, p. 1-6 (Year: 2015).*

Fang et al., A vision-based safety driver assistance system for motorcycles on a smartphone, 2014, IEEE, p. 328-333 (Year: 2014).*

International Search Report and Written Opinion for Application No. PCT/IB2020/052740 dated Jul. 6, 2020 (11 pages).

* cited by examiner

[FIG. 1]
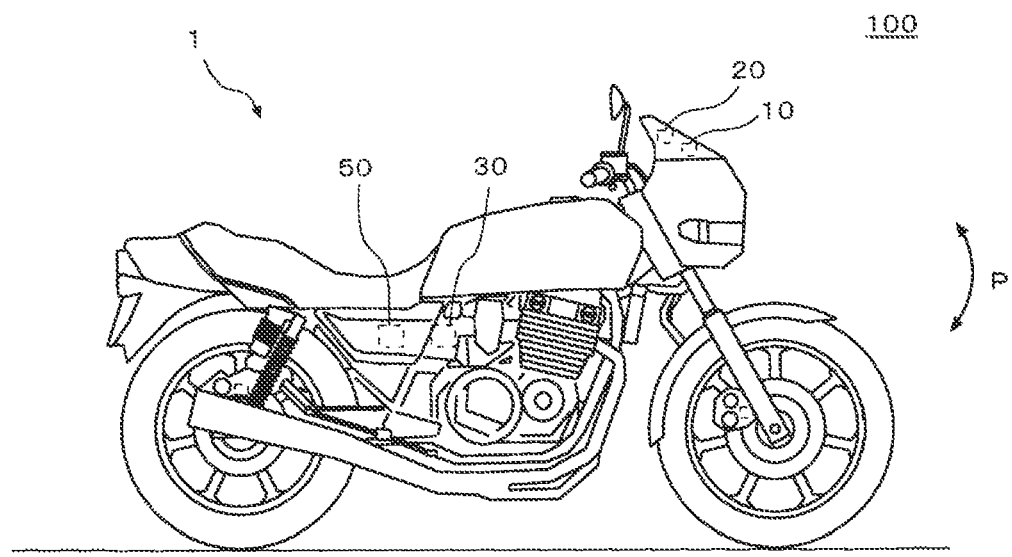
[FIG. 2]
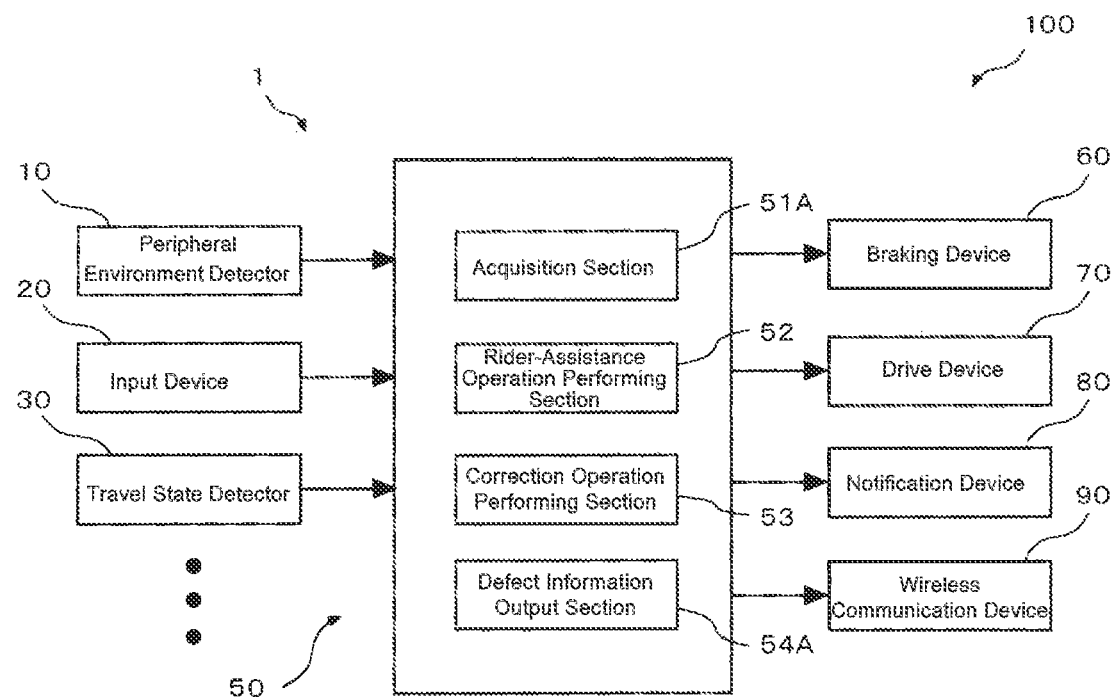

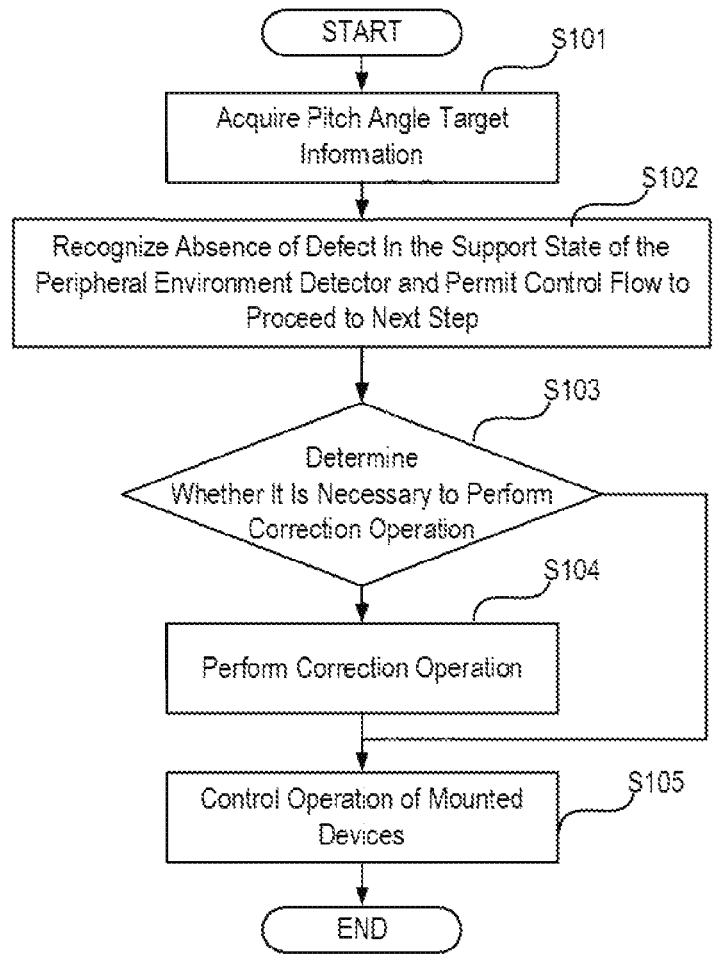
[FIG. 3]
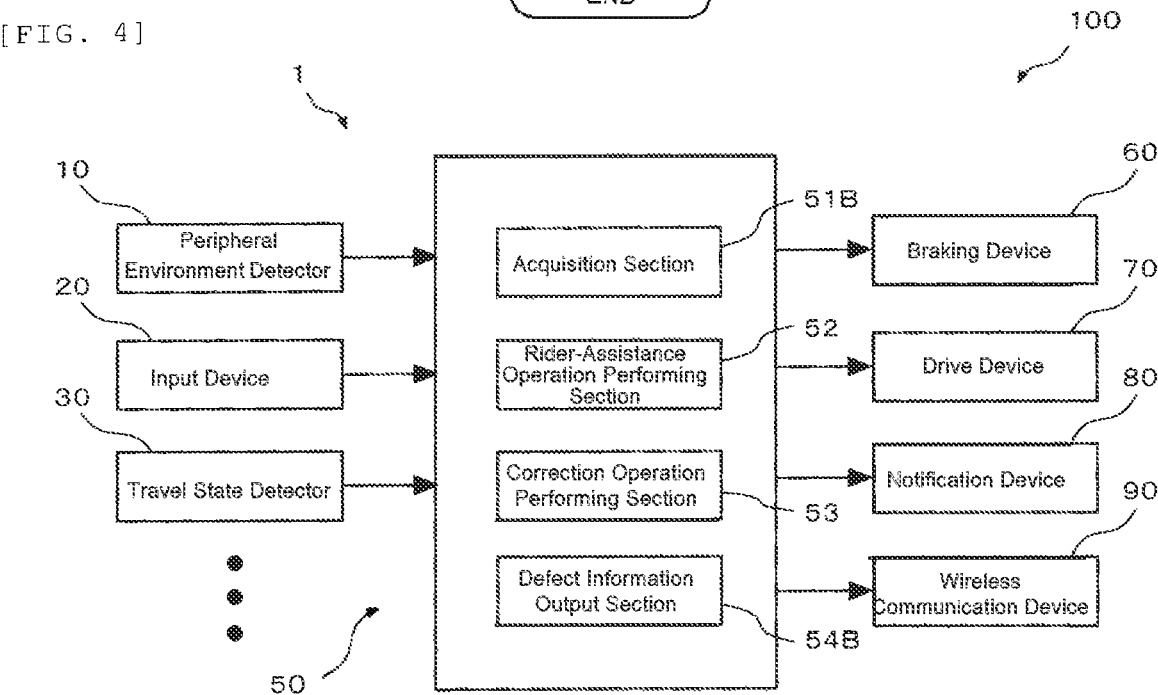
[FIG. 4]

[FIG. 5]
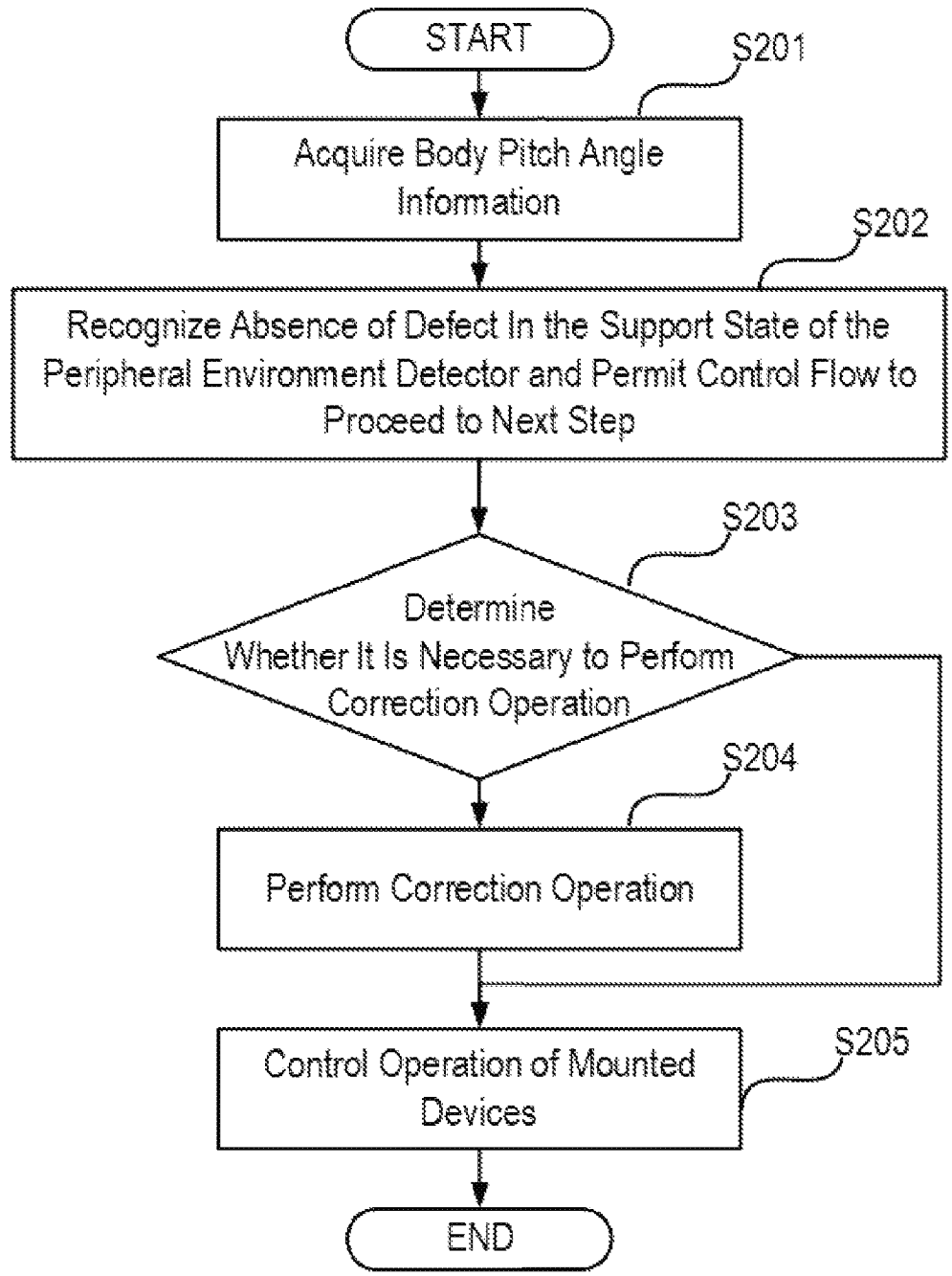

RIDER-ASSISTANCE SYSTEM AND CONTROL METHOD FOR RIDER-ASSISTANCE SYSTEM

BACKGROUND OF THE INVENTION

The present invention relates to a rider-assistance system for assisting with driving by a rider of a straddle-type vehicle and to a control method therefor.

As a technique related to a straddle-type vehicle, a rider-assistance system has been known. The rider-assistance system performs operation (for example, a warning function, an emergency braking function, a cruise travel function, and the like) to assist with driving by a rider of the straddle-type vehicle on the basis of output of a peripheral environment detector that is mounted to the straddle-type vehicle. The peripheral environment detector detects peripheral environment of the straddle-type vehicle (for example, see JP-A-2009-116882).

SUMMARY OF THE INVENTION

In the conventional rider-assistance system, the peripheral environment detector is attached with the assumption that a riding state and a loaded state of the straddle-type vehicle are standard (for example, the rider rides the straddle-type vehicle on his/her own and no object or the like is loaded). In particular, in the case where the straddle-type vehicle adopts a structure that a suspension is interposed between a body and each wheel and the riding state or the loaded state of the straddle-type vehicle are not standard (for example, the rider and a passenger ride the straddle-type vehicle, a heavy baggage or the like is loaded on the straddle-type vehicle, or the like), a significant change may occur to a pitch angle of the body of the straddle-type vehicle, and thus detection by the peripheral environment detector may become inappropriate. Compared to other vehicles (for example, a passenger car, a truck, and the like), the straddle-type vehicle has a short wheelbase and light body weight. Accordingly, the riding state or the loaded state have an enormous influence on the change in the pitch angle of the straddle-type vehicle. In other words, such a characteristic of the straddle-type vehicle that the riding state or the loaded state have the significant influence on the change in the pitch angle of the body of the straddle-type vehicle is not considered for the conventional rider-assistance system. As a result, the detection by the peripheral environment detector may become inappropriate.

The present invention has been made in view of the above-described problem as the background, and therefore obtains a rider-assistance system capable of appropriately assisting with driving by a rider of a straddle-type vehicle and a control method for such a rider-assistance system.

Solution to Problem

A rider-assistance system according to the present invention is a rider-assistance system that assists with driving by a rider of a straddle-type vehicle and includes: a peripheral environment detector that is mounted to the straddle-type vehicle and detects peripheral environment of the straddle-type vehicle; an input device that is mounted to the straddle-type vehicle and is operated by the rider of the straddle-type vehicle; and a controller that governs operation of the rider-assistance system. The controller includes: an acquisition section that acquires pitch angle correction target information that is target information on pitch angle correction of the peripheral environment detector; and a correction operation performing section that performs correction operation for detection of the peripheral environment by the peripheral environment detector on the basis of the pitch angle correction target information acquired by the acquisition section.

A control method for a rider-assistance system according to the present invention is a control method for a rider-assistance system that assists with driving by a rider of a straddle-type vehicle. The rider-assistance system includes: a peripheral environment detector that is mounted to the straddle-type vehicle and detects peripheral environment of the straddle-type vehicle; an input device that is mounted to the straddle-type vehicle and is operated by the rider of the straddle-type vehicle; and a controller that governs operation of the rider-assistance system. The control method includes: an acquisition step in which an acquisition section of the controller acquires pitch angle correction target information that is target information on pitch angle correction of the peripheral environment detector; and a correction operation performing step in which a correction operation performing section of the controller performs correction operation for detection of the peripheral environment by the peripheral environment detector on the basis of the pitch angle correction target information acquired in the acquisition step.

Advantageous Effects of Invention

In the rider-assistance system and the control method for the rider-assistance system according to the present invention, the acquisition section of the controller acquires the pitch angle correction target information that is the target information on the pitch angle correction of the peripheral environment detector, and the correction operation performing section of the controller performs the correction operation for the detection of the peripheral environment by the peripheral environment detector on the basis of the pitch angle correction target information. Thus, even in the case where a riding state or a loaded state of the straddle-type vehicle is not standard, it is possible to make the detection by the peripheral environment detector appropriate.

BRIEF DESCRIPTION OF THE DRAWINGS

FIG. 1 is a view of a mounted state of a rider-assistance system according to a first embodiment of the present invention to a straddle-type vehicle.

FIG. 2 is a diagram for illustrating a system configuration of the rider-assistance system according to the first embodiment of the present invention.

FIG. 3 is a chart of an example of a control flow in a controller of the rider-assistance system according to the first embodiment of the present invention.

FIG. 4 is a diagram for illustrating a system configuration of a rider-assistance system according to a second embodiment of the present invention.

FIG. 5 is a chart of an example of a control flow in a controller of the rider-assistance system according to the second embodiment of the present invention.

DETAILED DESCRIPTION

A description will hereinafter be made on a rider-assistance system and a control method for the rider-assistance system according to the present invention with reference to the drawings.

Note that each of a configuration, operation, and the like, which will be described below, is merely one example, and the rider-assistance system and the control method for the rider-assistance system according to the present invention are not limited to a case with such a configuration, such operation, and the like.

For example, a description will hereinafter be made on a case where the rider-assistance system according to the present invention is used for a two-wheeled motor vehicle. However, the rider-assistance system according to the present invention may be used for a straddle-type vehicle other than the two-wheeled motor vehicle. The straddle-type vehicle means a vehicle in general that a rider straddles. The straddle-type vehicle preferably adopts a structure that a suspension is interposed between a body and each wheel. The straddle-type vehicles include motorcycles (the two-wheeled motor vehicle and a three-wheeled motor vehicle), an all-terrain vehicle, a pedal-driven vehicle, and the like, for example. The motorcycles include: the two-wheeled motor vehicle or the three-wheeled motor vehicle that has an engine as a propelling source; the two-wheeled motor vehicle or the three-wheeled motor vehicle that has a motor as the propelling source; and the like, and include a bike, a scooter, an electric scooter, and the like, for example. The pedal-driven vehicle means a vehicle in general that can travel forward on a road by a depressing force applied to pedals by the rider. The pedal-driven vehicles include a normal pedal-driven vehicle, an electrically-assisted pedal-driven vehicle, an electric pedal-driven vehicle, and the like.

The same or similar description will appropriately be simplified or will not be made below. In the drawings, the same or similar members or portions will not be denoted by a reference sign or will be denoted by the same reference sign. In addition, a detailed structure will appropriately be illustrated in a simplified manner or will not be illustrated.

First Embodiment

A description will hereinafter be made on a rider-assistance system according to a first embodiment.
<Configuration of Rider-Assistance System>

A description will be made on a configuration of the rider-assistance system according to the first embodiment. FIG. 1 is a view of a mounted state of the rider-assistance system according to the first embodiment of the present invention to the straddle-type vehicle. FIG. 2 is a diagram for illustrating a system configuration of the rider-assistance system according to the first embodiment of the present invention.

As illustrated in FIG. 1 and FIG. 2, a rider-assistance system 1 is mounted to a straddle-type vehicle 100. The rider-assistance system. 1 includes a peripheral environment detector 10, an input device 20, a travel state detector 30, and a controller 50.

In the rider-assistance system 1, the peripheral environment detector 10 is used to recognize a target (for example, an obstacle, a preceding vehicle, a traffic sign, or the like) located around the straddle-type vehicle 100, and information on the recognized target is supplied to various devices (for example, a braking device 60, a drive device 70, a notification device 80, and the like) that implement functions (for example, a warning function, an emergency braking function, a cruise travel function, and the like) of assisting with driving by the rider. Each of the devices in the rider-assistance system 1 may exclusively be used for the rider-assistance system 1, or may be shared with another system.

The peripheral environment detector 10 monitors peripheral environment of the straddle-type vehicle 100 and detects various types of information on the peripheral environment of the straddle-type vehicle 100. Examples of the peripheral environment detector 10 are a camera that captures images in front or, behind, on a side, or the like of the straddle-type vehicle 100 and a distance measurement sensor capable of detecting a distance from the straddle-type vehicle 100 to the target that exists in front of, behind, on the side, or the like of the straddle-type vehicle 100. A detection result of the peripheral environment detector 10 is output to the controller 50.

The input device 20 accepts setting operations (for example, a selection operation, an input operation, and the like) by the rider and outputs rider setting information that is information on the setting operations by the rider to the controller 50. Here, in the straddle-type vehicle 100, as will be described later, the controller 50 can perform rider-assistance operation. The rider can perform the setting operations related to the rider-assistance operation by using the input device 20. As the input device 20, a lever, a button, a touchscreen, or the like is used, for example. The input device 20 is provided to a handlebar, for example. The input device 20 preferably includes a display screen that shows necessary information for the setting operations.

The travel state detector 30 detects information on travel states (for example, a speed, acceleration/deceleration, a position, an advancing direction, and the like) of the straddle-type vehicle 100. A detection result of the travel state detector 30 is output to the controller 50.

The travel state detector 30 includes a front-wheel rotational frequency sensor, a rear-wheel rotational frequency sensor, and the like, for example. Each of the front-wheel rotational frequency sensor and the rear-wheel rotational frequency sensor detects a rotational frequency of the wheel and outputs a detection result. Each of the front-wheel rotational frequency sensor and the rear-wheel rotational frequency sensor may detect another physical quantity that can substantially be converted to the rotational frequency of the wheel.

The travel state detector 30 also includes an inertial measurement device, for example. The inertial measurement device includes a three-axis gyroscope sensor and a three-directional acceleration sensor and outputs detection results of three-axis acceleration and three-axis angular velocities of the straddle-type vehicle 100. The inertial measurement device may detect other physical quantities that can substantially be converted to the three-axis acceleration and the three-axis angular velocities.

The travel state detector 30 further includes a braking force measurement device, a drive power measurement device, and the like, for example. For example, the braking force measurement device outputs detection results such as an operation amount of a brake operation by the rider and an actual braking force generated by the braking device 60. The braking force measurement device may detect other physical quantities that can substantially be converted to the operation amount of the brake operation by the rider and the actual braking force generated by the braking device 60. For example, the drive power measurement device outputs detection results such as an operation amount of an accelerator operation by the rider and actual drive power generated by the drive device 70. The drive power measurement device may detect other physical quantities that can substantially be converted to the operation amount of the accelerator operation by the rider and the actual drive power generated by the drive device 70.

The travel state detector 30 includes a receiver that receives a signal from a Global Positioning System (GPS) satellite and a storage section that stores map information, for example. Another configuration capable of detecting the position or the advancing direction of the straddle-type vehicle 100 may be adopted.

The controller 50 controls operation of the straddle-type vehicle 100. For example, the controller 50 is partially or entirely constructed of a microcomputer, a microprocessor unit, or the like. Alternatively, the controller 50 may partially or entirely be constructed of a member in which firmware or the like can be updated, or may partially or entirely be a program module or the like that is executed by a command from a CPU or the like, for example. The controller 50 may be provided as one unit or may be divided into multiple units, for example.

As illustrated in FIG. 2, the controller 50 includes an acquisition section 51A, a rider-assistance operation performing section 52, a correction operation performing section 53, and a defect information output section 54A.

The acquisition section 51A acquires information that is output from each of the devices mounted to the straddle-type vehicle 100, and outputs the acquired information to the rider-assistance operation performing section 52. More specifically, the acquisition section 51A acquires peripheral environment information on the basis of the information output from the peripheral environment detector 10, acquires the rider setting information on the basis of the information output from the input device 20, and acquires travel state information of the straddle-type vehicle 100 on the basis of the information output from the travel state detector 30.

The rider-assistance operation performing section 52 controls operation of each of the devices (the braking device 60, the drive device 70, the notification device 80, and the like) mounted to the straddle-type vehicle 100, so as to perform various types of operation for assisting with driving by the rider of the straddle-type vehicle 100. The rider-assistance operation performing section 52 performs the rider-assistance operation that corresponds to the peripheral environment information output from the acquisition section 51A. The rider can instruct to enable or disable each of the functions (for example, the warning function, the emergency braking function, the cruise travel function, and the like) of the rider-assistance operation by using the input device 20. The rider-assistance operation performing section 52 performs the rider-assistance operation corresponding to the rider setting information output from the acquisition section 51A. In addition, the rider-assistance operation performing section 52 performs the rider-assistance operation corresponding to the travel state information output from the acquisition section 51A when necessary.

Here, the notification device 80 may warn the rider by sound (that is, a sensation through an auditory organ as a sensory organ), may warn the rider by a display (that is, a sensation through a visual organ as the sensory organ), may warn the rider by vibrations (that is, a sensation through a tactile organ as the sensory organ), or may warn the rider by a combination of those. The notification device 80 may be provided to the straddle-type vehicle 100 or may be provided to an accessory such as a helmet that is associated with the straddle-type vehicle 100. In addition the notification device 80 may be constructed of a single output device or may be constructed of multiple output devices of the same type or different types. The multiple output devices may be provided integrally or may be provided separately. Furthermore, the notification device 80 may warn the rider by generating the sudden acceleration/deceleration to the straddle-type vehicle 100. That is, the notification device 80 may be realized by the braking device 60, the drive device 70, or the like.

The acquisition section 51A acquires pitch angle correction target information that is target information on pitch angle correction of the peripheral environment detector 10 on the basis of the rider setting information output from the input device 20, and outputs the pitch angle correction target information to the correction operation performing section 53. Then, based on the pitch angle correction target information, the correction operation performing section 53 performs correction operation in regard to the detection of the peripheral environment by the peripheral environment detector 10. The correction operation performing section 53 may perform, as the correction operation thereof, mechanical correction operation to correct the pitch angle of the peripheral environment detector 10 by changing a support state of the peripheral environment detector 10, or correction operation related to information processing in which the detection result of the peripheral environment detector 10 is subjected to correction processing (for example, coordinate conversion processing to change the pitch angle in detected data itself or coordinate conversion processing to change the pitch angle with respect to a coordinate origin in the detected data). The pitch angle is an angle represented by P in FIG. 1 and is defined as a rotation angle about an axis that is parallel to a vehicle width direction of the straddle-type vehicle 100.

As an example, the rider can select a mode of the riding state or the loaded state (for example, a solo riding mode, a tandem mode, a heavy baggage mode, or the like) with the input device 20. Then, the acquisition section 51A acquires the mode selected by the rider with the input device 20 as the rider setting information, and acquires the pitch angle correction target information corresponding to the mode. For example, in the case where the solo riding mode is selected with the input device 20, the acquisition section 51A acquires 0° as an angle value of the pitch angle correction target information. In the case where the tandem mode or the heavy baggage mode is selected with the input device 20, the acquisition section 51A acquires 3° as the angle value of the pitch angle correction target information. In the case where the peripheral environment detector 10 detects the front peripheral environment, the correction operation performing section 53 shifts the support state of the peripheral environment detector 10 downward by the angle value of the pitch angle correction target information, or performs an upward coordinate transformation of the detection result of the peripheral environment detector 10. Meanwhile, in the case where the peripheral environment detector 10 detects the rear peripheral environment, the correction operation performing section 53 shifts the support state of the peripheral environment detector 10 upward by the angle value of the pitch angle correction target information, or performs a downward coordinate transformation of the detection result of the peripheral environment detector 10.

As an example, the rider can input weight of an occupant or the loaded object to the input device 20. Then, the acquisition section 51A acquires the weight, which is input to the input device 20 by the rider, as the rider setting information and acquires the pitch angle correction target information corresponding to the weight. For example, in the case where total weight input to the input device 20 is less than 80 kgf, the acquisition section 51A acquires 0° as the angle value of the pitch angle correction target information. Meanwhile, in the case where the total weight input to the input device 20 is equal to or greater than 80 kgf and less than 160 kgf, the acquisition section 51A acquires 3° as the angle value of the pitch angle correction target information. In the case where total weight input to the input device 20 is equal to or greater than 160 kgf, the acquisition section 51A acquires 5° as the angle value of the pitch angle correction target information. In the case where the peripheral environment detector 10 detects the front peripheral environment, the correction operation performing section 53 shifts the support state of the peripheral environment detector 10 downward by the angle value of the pitch angle correction target information, or performs the upward coordinate transformation of the detection result of the peripheral environment detector 10. Meanwhile, in the case where the peripheral environment detector 10 detects the rear peripheral environment, the correction operation performing section 53 shifts the support state of the peripheral environment detector 10 upward by the angle value of the pitch angle correction target information, or performs the downward coordinate transformation of the detection result of the peripheral environment detector 10. The rider may be able to input the weight per occupant or per loaded object to the input device 20. In such a case, it is possible to acquire the further accurate pitch angle correction target information.

As an example, based on the detection result of the peripheral environment detector 10, the acquisition section 51A acquires pitch angle correction recommendation information that is information for recommending the pitch angle correction of the peripheral environment detector 10, and the input device 20 can notify the rider of the pitch angle correction recommendation information. Then, the rider can select legitimacy or illegitimacy of the pitch angle correction recommendation information with the input device 20. The acquisition section 51A acquires information on the legitimacy or the illegitimacy of the pitch angle correction recommendation information selected by the rider with the input device 20 as the rider setting information, and acquires the pitch angle correction target information corresponding to the selection. For example, in the case where sudden movement (downward movement when the peripheral environment detector 10 detects the front peripheral environment or upward movement when the peripheral environment detector 10 detects the rear peripheral environment) in a pitch angle direction occurs in all the data of the detection results of the peripheral environment detector 10 while the straddle-type vehicle 100 is stopped, the acquisition section 51A acquires 3° as an angle value of the pitch angle correction recommendation information. The acquisition section 51A may acquire, as the pitch angle correction recommendation information, the mode of the riding state or the loaded state that corresponds to the angle value. While referring to the notified pitch angle correction recommendation information, the rider selects the legitimacy or the illegitimacy thereof with the input device 20. In the case where the rider selects the legitimacy of the pitch angle correction recommendation information, the acquisition section 51A acquires 3° as the angle value of the pitch angle correction target information. On the other hand, in the case where the rider selects the illegitimacy of the pitch angle correction recommendation information, a mode selection screen for the riding state or the loaded state, a weight input screen for the occupant or the loaded object, or the like is displayed on the input device 20, and the rider is prompted to input the appropriate rider setting information. Instead of the configuration that the rider selects the legitimacy or the illegitimacy of the pitch angle correction recommendation information with the input device 20 while referring thereto, a configuration that the rider selects the mode of the riding state or the loaded state, inputs the weight of the occupant or the loaded object, or the like may be adopted.

The defect information output section 54A outputs information on presence or absence of a defect in the support state of the peripheral environment detector 10 on the basis of the rider setting information. For example, in regard to the selection of the mode of the riding state or the loaded state, the input of the weight of the occupant or the loaded object, the selection of the legitimacy or the illegitimacy of the pitch angle correction recommendation information, and the like, in the case where the change in the pitch angle is not caused by the riding state or the loaded state, the rider can skip the selection or the input or can input inappropriateness of the support state of the peripheral environment detector 10 when operating the input device 20. When such rider setting information is output from the input device 20, the defect information output section 54A recognizes presence of the defect in the support state of the peripheral environment detector 10, and outputs such a fact to the rider-assistance operation performing section 52, the notification device 80, a wireless communication device 90, and the like. The rider-assistance operation performing section 52 may prohibit the rider-assistance operation, the notification device 80 may notify the rider of a problem, recommendation for repair, and the like of the rider-assistance operation, or the wireless communication device 90 may inform a dealer, a repair shop, or the like of the defect in the support state of the peripheral environment detector 10.

<Operation of Rider-Assistance System>

A description will be made on the operation of the rider-assistance system according to the first embodiment. FIG. 3 is a chart of an example of a control flow in the controller of the rider-assistance system according to the first embodiment of the present invention.

The controller 50 repeatedly executes the control flow illustrated in FIG. 3 while the rider-assistance operation is valid.

(Acquisition Step)

In step S101, the acquisition section 51A acquires the pitch angle correction target information, which is the target information on the pitch angle correction of the peripheral environment detector 10, on the basis of the rider setting information output from the input device 20. The acquisition section 51A also acquires the peripheral environment information on the basis of the information output from the peripheral environment detector 10, acquires the rider setting information on the basis of the information output from the input device 20, and acquires the travel state information of the straddle-type vehicle 100 on the basis of the information output from the travel state detector 30.

(Defect Information Output Step)

In step S102, the defect information output section 54A recognizes absence of the defect in the support state of the peripheral environment detector 10 on the basis of the rider setting information, and permits the control flow to proceed to the next step. In the case where the defect information output section 54A recognizes the presence of the defect, the defect information output section 54A preferably prohibit the control flow from proceeding to the next step, and execute processing such as disabling the rider-assistance operation.

(Correction Operation Performing Step)

In step S103, the correction operation performing section 53 determines whether it is necessary to perform the correction operation for the detection of the peripheral environment by the peripheral environment detector 10 on the basis of the pitch angle correction target information acquired in step S101. If determining that it is necessary, in step S104, the correction operation performing section 53 performs the correction operation therefor.

(Rider-Assistance Operation Performing Step)

In step S105, the rider-assistance operation performing section 52 controls operation of each of the devices (the braking device 60, the drive device 70, the notification device 80, and the like) mounted to the straddle-type vehicle 100 on the basis of the peripheral environment information, the rider setting information, and the travel state information acquired in step S101, so as to perform the rider-assistance operation.

<Effects of Rider-Assistance System>

A description will be made on effects of the rider-assistance system according to the first embodiment.

In the rider-assistance system 1, the controller 50 includes: the acquisition section 51A that acquires the pitch angle correction target information that is the target information on the pitch angle correction of the peripheral environment detector 10; and the correction operation performing section 53 that performs the correction operation for the detection of the peripheral environment by the peripheral environment detector 10 on the basis of the pitch angle correction target information acquired by the acquisition section 51A. Thus, even in the case where the riding state or the loaded state of the straddle-type vehicle 100 is not standard, it is possible to make the detection by the peripheral environment detector 10 appropriate.

Preferably, the acquisition section 51A acquires the pitch angle correction target information on the basis of the rider setting information output from the input device 20. With such a configuration, even in the case where the rider-assistance system 1 cannot determine or does not determine whether the pitch angle is changed by a change in the riding state or the loaded state of the straddle-type vehicle 100 or whether the pitch angle is changed by a change in the support state of the peripheral environment detector 10 caused by falling, breakage, or the like at the time when the pitch angle of the peripheral environment detector 10 is changed, it is possible to make the detection by the peripheral environment detector 10 appropriate.

In particular, the rider can preferably select the mode of the riding state or the loaded state with the input device 20, and the rider setting information preferably includes the mode selected by the rider. With such a configuration, the setting operation by the rider is simplified.

In particular, the rider can preferably input the weight of the occupant or the loaded object to the input device 20, and the rider setting information preferably includes the information on the weight input by the rider. With such a configuration, it is possible to make the detection by the peripheral environment detector 10 further appropriate on the basis of the detailed rider setting information.

In particular, based on the detection result of the peripheral environment detector 10, the acquisition section 51A preferably acquires the pitch angle correction recommendation information that is the information for recommending the pitch angle correction, and the input device 20 can preferably notify the rider of the pitch angle correction recommendation information acquired by the acquisition section 51A. With such a configuration, the setting operation by the rider is facilitated. Furthermore, the rider can preferably select the legitimacy or the illegitimacy of pitch angle correction recommendation information with the input device 20, and the rider setting information preferably includes the information on the legitimacy or the illegitimacy of the pitch angle correction recommendation information selected by the rider. In such a case, the setting operation by the rider is further simplified.

In particular, the controller 50 preferably and further includes the defect information output section 54A that acquires and outputs the information on the presence or the absence of the defect in the support state of the peripheral environment detector 10 on the basis of the rider setting information. With such a configuration, feasibility of the appropriate rider-assistance operation is improved.

Second Embodiment

A description will be made on a rider-assistance system according to a second embodiment.

<Configuration of Rider-Assistance System>

A description will be made on a configuration of the rider-assistance system according to the second embodiment. FIG. 4 is a diagram for illustrating a system configuration of the rider-assistance system according to the second embodiment of the present invention.

As illustrated in FIG. 4, the controller 50 includes an acquisition section 51B, the rider-assistance operation performing section 52, the correction operation performing section 53, and a defect information output section 54B. Here, since the rider-assistance operation performing section 52 and the correction operation performing section 53 are the same as the rider-assistance operation performing section 52 and the correction operation performing section 53 in the first embodiment, the description thereon will not be made.

The acquisition section 51B acquires body pitch angle information that is information on a pitch angle of a body of the straddle-type vehicle 100 on the basis of the detection result of the travel state detector 30, acquires the pitch angle correction target information that is the target information on the pitch angle correction of the peripheral environment detector 10 on the basis of the body pitch angle information, and outputs the pitch angle correction target information to the correction operation performing section 53. For example, the acquisition section 51B acquires the body pitch angle information on the basis of a detection result of an inertial measurement device as the travel state detector 30 at the time when the straddle-type vehicle 100 is stopped. Alternatively, for example, the acquisition section 51B acquires the body pitch angle information on the basis of a detection result of a seat load measurement device as the travel state detector 30 at the time when the straddle-type vehicle 100 is stopped. Further alternatively, for example, the acquisition section 51B acquires the body pitch angle information on the basis of a detection result of a suspension stroke measurement device as the travel state detector 30 at the time when the straddle-type vehicle 100 is stopped. For example, the acquisition section 51B acquires, as the pitch angle correction target information, an angle value that offsets an angle value as the body pitch angle information.

The defect information output section 54B outputs information on the presence or the absence of the defect in the support state of the peripheral environment detector 10 on the basis of the detection result of the peripheral environment detector 10 and the body pitch angle information. For example, the defect information output section 54B compares a gap in the pitch angle direction among the data in the detection result of the peripheral environment detector 10 with a change in the pitch angle of the body in the body pitch angle information, so as to determine presence or absence of a corresponding relationship therebetween. In the case where there is no corresponding relationship, the defect information output section 54B outputs information on the presence of the defect in the support state of the peripheral environment detector 10. The rider-assistance operation performing section 52 may prohibit the rider-assistance operation, the notification device 80 may notify the rider of the problem, the recommendation for the repair, and the like of the rider-assistance operation, or the wireless communication device 90 may inform the dealer, the repair shop, or the like of the defect in the support state of the peripheral environment detector 10.

<Operation of Rider-Assistance System>

A description will be made on the operation of the rider-assistance system according to the second embodiment. FIG. 5 is a chart of an example of a control flow in the controller of the rider-assistance system according to the second embodiment of the present invention.

The controller 50 repeatedly executes the control flow illustrated in FIG. 5 while the rider-assistance operation is valid. Since step S203 to step S205 are the same as step S103 to step S105 in the first embodiment, a description thereon will not be made.

(Acquisition Step)

In step S201, the acquisition section 51B acquires the body pitch angle information that is the information on the pitch angle of the body of the straddle-type vehicle 100, and acquires the pitch angle correction target information that is the target information on the pitch angle correction of the peripheral environment detector 10 on the basis of the body pitch angle information. The acquisition section 51B also acquires the peripheral environment information on the basis of the information output from the peripheral environment detector 10, acquires the rider setting information on the basis of the information output from the input device 20, and acquires the travel state information of the straddle-type vehicle 100 on the basis of the information output from the travel state detector 30.

(Defect Information Output Step)

In step S202, the defect information output section 54B recognizes the absence of the defect in the support state of the peripheral environment detector 10 on the basis of the detection result of the peripheral environment detector 10 and the body pitch angle information, and permits the control flow to proceed to the next step. In the case where the defect information output section 54B recognizes the presence of the defect, the defect information output section 54B preferably prohibits the control flow from proceeding to the next step, and executes the processing such as disabling the rider-assistance operation.

<Effects of Rider-Assistance System>

A description will be made on effects of the rider-assistance system according to the second embodiment.

In the rider-assistance system 1, the controller 50 includes: the acquisition section 51B that acquires the pitch angle correction target information that is the target information on the pitch angle correction of the peripheral environment detector 10; and the correction operation performing section 53 that performs the correction operation for the detection of the peripheral environment by the peripheral environment detector 10 on the basis of the pitch angle correction target information acquired by the acquisition section 51B. Thus, even in the case where the riding state or the loaded state of the straddle-type vehicle 100 is not standard, it is possible to make the detection by the peripheral environment detector 10 appropriate.

Preferably, the acquisition section 51B acquires the body pitch angle information that is the information on the pitch angle of the body of the straddle-type vehicle 100, and acquires the pitch angle correction target information on the basis of the body pitch angle information. With such a configuration, it is possible to make the detection by the peripheral environment detector 10 appropriate in a completely or partially automated manner.

In particular, the body pitch angle information is preferably acquired according to output of the inertial measurement device mounted to the straddle-type vehicle 100, is preferably acquired according to output of the seat load measurement device mounted to the straddle-type vehicle 100, or is preferably acquired according to output of the suspension stroke measurement device mounted to the straddle-type vehicle 100. With such a configuration, it is possible to provide the accurate body pitch angle information and make the detection by the peripheral environment detector 10 further appropriate.

In particular, the controller 50 preferably and further includes the defect information output section 54B that acquires and outputs the information on the presence or the absence of the defect in the support state of the peripheral environment detector 10 on the basis of the detection result of the peripheral environment detector 10 and the body pitch angle information. With such a configuration, the feasibility of the appropriate rider-assistance operation is improved.

The description has been made so far on the first embodiment and the second embodiment. However, the present invention is not limited to the description of each of the embodiments. For example, only a part of each of the embodiments may be implemented, or all or parts of the embodiments may be combined.

For example, in the first embodiment and the second embodiment, the defect information output step may not be provided. In addition, for example, the defect information output step executed in the first embodiment may be the same as the defect information output step described in the second embodiment. Furthermore, the defect information output step executed in the second embodiment may be the same as the defect information output step described in the first embodiment.

REFERENCE SIGNS LIST

1: Rider-assistance system
10: Peripheral environment detector
20: Input device
30: Travel state detector
50: Controller
51A, 51B: Acquisition section
52: Rider-assistance operation performing section
53: Correction operation performing section
54A, 54B: Defect information output section
60: Braking device
70: Drive device
80: Notification device
90: Wireless communication device
100: Straddle-type vehicle

The invention claimed is:

1. A rider-assistance system (1) that assists with driving by a rider of a straddle-type vehicle (100), the rider-assistance system (1) comprising:
a peripheral environment detector (10) that is mounted to the straddle-type vehicle (100) and detects peripheral environment of said straddle-type vehicle (100);
an input device (20) that is mounted to the straddle-type vehicle (100) and is operated by the rider of said straddle-type vehicle (100); and a controller (50) that governs operation of the rider-assistance system (1), wherein the controller (50) includes:
- an acquisition section (51A, 51B) that acquires pitch angle correction target information that is target information on pitch angle correction of the peripheral environment detector (10); and
- a correction operation performing section (53) that performs correction operation for detection of the peripheral environment by the peripheral environment detector (10) on the basis of the pitch angle correction target information acquired by the acquisition section (51A, 51B).

2. The rider-assistance system (1) according to claim 1, wherein the acquisition section (51A) acquires the pitch angle correction target information on the basis of rider setting information output from the input device (20).

3. The rider-assistance system (1) according to claim 2, wherein the rider can select a mode of a riding state or a loaded state with the input device (20), and the rider setting information includes information on the mode selected by the rider.

4. The rider-assistance system (1) according to claim 2, wherein the rider can input weight of an occupant or a loaded object with the input device (20), and the rider setting information includes information on the weight input by the rider.

5. The rider-assistance system (1) according to claim 2, wherein
- the acquisition section (51A) acquires pitch angle correction recommendation information that is information for recommending the pitch angle correction on the basis of a detection result of the peripheral environment detector (10), and
- the input device (20) can notify the rider of the pitch angle correction recommendation information acquired by the acquisition section (51A).

6. The rider-assistance system (1) according to claim 5, wherein
- the rider can select legitimacy or illegitimacy of the pitch angle correction recommendation information with the input device (20), and
- the rider setting information includes information on the legitimacy or the illegitimacy of the pitch angle correction recommendation information selected by the rider.

7. The rider-assistance system (1) according to claim 2, wherein the controller (50) further includes a defect information output section (54A) that acquires and outputs an information on presence or absence of a defect in a support state of the peripheral environment detector (10) on the basis of the rider setting information.

8. The rider-assistance system (1) according to claim 1, wherein the acquisition section (51B) acquires body pitch angle information that is information on a pitch angle of a body of the straddle-type vehicle (100), and acquires the pitch angle correction target information on the basis of the body pitch angle information.

9. The rider-assistance system (1) according to claim 8, wherein the body pitch angle information is acquired according to output of an inertial measurement device mounted to the straddle-type vehicle (100).

10. The rider-assistance system (1) according to claim 8, wherein the body pitch angle information is acquired according to output of a seat load measurement device mounted to the straddle-type vehicle (100).

11. The rider-assistance system (1) according to claim 8, wherein the body pitch angle information is acquired according to output of a suspension stroke measurement device mounted to the straddle-type vehicle (100).

12. The rider-assistance system (1) according to claim 8, wherein the controller (50) further includes a defect information output section (54B) that acquires and outputs an information on presence or absence of a defect in a support state of the peripheral environment detector (10) on the basis of a detection result of the peripheral environment detector (10) and the body pitch angle information.

13. The rider-assistance system (1) according to claim 1, wherein the correction operation performing section (53) performs, as the correction operation, operation to change a support state of the peripheral environment detector (10).

14. The rider-assistance system (1) according to claim 1, wherein the correction operation performing section (53) performs, as the correction operation, operation to subject a detection result of the peripheral environment detector (10) to correction processing.

15. A control method for a rider-assistance system (1) that assists with driving by a rider of a straddle-type vehicle (100),
- the rider-assistance system (1) including: a peripheral environment detector (10) that is mounted to the straddle-type vehicle (100) and detects peripheral environment of said straddle-type vehicle (100); an input device (20) that is mounted to the straddle-type vehicle (100) and is operated by the rider of said straddle-type vehicle (100); and a controller (50) that governs operation of the rider-assistance system (1),
- the control method comprising:
- an acquisition step (S101, S201) in which an acquisition section (51A, 51B) of the controller (50) acquires pitch angle correction target information that is target information on pitch angle correction of the peripheral environment detector (10); and
- a correction operation performing step (S103, S104, S203, S204) in which a correction operation performing section (53) of the controller (50) performs correction operation for detection of the peripheral environment by the peripheral environment detector (10) on the basis of the pitch angle correction target information acquired in the acquisition step (S101, S201).

* * * * *